(12) United States Patent
Walter

(10) Patent No.: US 8,813,879 B2
(45) Date of Patent: Aug. 26, 2014

(54) ELECTRIC STEERING AND DRIVING SYSTEM FOR A LATERAL WHEEL-STEERING VEHICLE

(75) Inventor: Alexander Walter, Augsburg (DE)

(73) Assignee: RENK Aktiengesellschaft, Augsburg (DE)

( * ) Notice: Subject to any disclaimer, the term of this patent is extended or adjusted under 35 U.S.C. 154(b) by 1063 days.

(21) Appl. No.: 10/581,427

(22) PCT Filed: Dec. 4, 2003

(86) PCT No.: PCT/EP03/13737
§ 371 (c)(1),
(2), (4) Date: Aug. 16, 2006

(87) PCT Pub. No.: WO2005/054041
PCT Pub. Date: Jun. 16, 2005

(65) Prior Publication Data
US 2007/0012505 A1    Jan. 18, 2007

(51) Int. Cl.
*B60K 5/08* (2006.01)
*B62D 11/04* (2006.01)
*B62D 11/14* (2006.01)
*H02P 25/22* (2006.01)
*B60K 7/00* (2006.01)

(52) U.S. Cl.
CPC ............ *B62D 11/04* (2013.01); *H02P 25/22* (2013.01); *B60K 7/0007* (2013.01); *B60K 2007/003* (2013.01); *B62D 11/14* (2013.01); *B60Y 2200/25* (2013.01)
USPC ........ 180/6.44; 180/6.5; 180/65.31; 180/69.6

(58) Field of Classification Search
USPC ............... 180/69.6, 6.48, 6.5, 6.2, 65.1, 65.2, 180/65.3, 65.4, 6.44, 6.7, 65.31
See application file for complete search history.

(56) References Cited

U.S. PATENT DOCUMENTS

| | | | | |
|---|---|---|---|---|
| 2,689,013 A | * | 9/1954 | Dean et al. ................... | 180/53.1 |
| 2,832,201 A | * | 4/1958 | Alexander ...................... | 60/716 |
| 3,197,962 A | * | 8/1965 | Suttles ............................ | 60/717 |
| 3,645,351 A | * | 2/1972 | Muller ......................... | 180/69.6 |

(Continued)

FOREIGN PATENT DOCUMENTS

| | | |
|---|---|---|
| DE | 100 05 527 | 8/2001 |
| EP | 1 060 941 | 12/2000 |
| JP | 62137281 | 6/1987 |

OTHER PUBLICATIONS

Search Report dated Aug. 23, 2004 corresponding to the International PCT Application No. PCT/EP2003/013737.

*Primary Examiner* — Anne Marie Boehler
(74) *Attorney, Agent, or Firm* — Cozen O'Connor

(57) ABSTRACT

The invention relates to an electric steering and drive system for a vehicle having a wheel-based steering system, having drive elements for traction tracks or for wheels and having two drive shafts, the first end of which is connected to the drive element of the respective one vehicle side and the second end of which is connected to a differential gear mechanism arrangement, and at least one traction motor is connected to at least one of the two drive shafts, and having an electric steering drive which is drive-connected to the differential gear mechanism arrangement, it being possible for the traction motors and steering drives to be supplied with electric current from at least two energy sources which are independent of one another.

10 Claims, 2 Drawing Sheets

(56) References Cited

U.S. PATENT DOCUMENTS

| | | | |
|---|---|---|---|
| 4,270,622 A * | 6/1981 | Travis | 180/65.4 |
| 4,917,200 A * | 4/1990 | Lucius | 180/6.2 |
| 4,998,591 A | 3/1991 | Zaunberger | |
| 6,691,806 B2 * | 2/2004 | Wolfgang et al. | 180/6.7 |
| 2002/0124669 A1 * | 9/2002 | Melis | 74/335 |
| 2004/0116228 A1 | 6/2004 | Thompson | |

* cited by examiner

US 8,813,879 B2

ELECTRIC STEERING AND DRIVING SYSTEM FOR A LATERAL WHEEL-STEERING VEHICLE

CROSS-REFERENCE TO RELATED APPLICATIONS

This is a US national stage of application No. PCT/EP2003/013737, filed on 4 Dec. 2003.

BACKGROUND OF THE INVENTION

1. Field of the Invention

The invention relates to an electric steering and drive system for a vehicle having a wheel-based steering system with a pair of drive shafts, a differential gear mechanism connected to the drive shafts, a traction drive including at least one traction motor connected to at least one of the drive shafts, and an electric steering drive which is drive-connected to the differential gear mechanism.

2. Description of the Related Art

Vehicles having a wheel-based steering system travel around bends by one drive side being driven at a different speed to the other. The wheel-based steering system is used mainly in tracked vehicles. In order to travel around bends, the drive device drives the traction track on the outside of the bend at a higher speed than the traction track on the inside of the bend and therefore, in addition to the task of driving, also assumes the steering function of the vehicle. In order to rotate a vehicle of this type on the spot, the traction tracks of the two vehicle sides can be driven in opposite directions.

As the steering system also fails in vehicles of this type in the event of the failure of or problems with the drive system, special measures have to be taken in order to bring the vehicle at least to a standstill safely. In military vehicles, the requirements are even higher. Vehicles of this type are also intended to be drivable and steerable in the event of partial damage to their drive system, in order to move themselves, for example, out of a danger zone under their own power, but optionally admittedly with reduced drive power.

U.S. Pat. No. 4,998,591 describes an electromechanical drive system for fully tracked vehicles. A generator which is driven by an internal combustion engine is provided for the generation of the electric power. According to one embodiment, this drive system comprises an electric traction motor, which drives both vehicle sides in the same direction via a central shaft, and an electric steering motor which drives a zero shaft, the rotational speed of which has a positive effect on one side and a negative effect on the other side. Steering differentials on the left and the right add the rotational speeds of the two motors and forward the sum to the track wheels. This electromechanical steering system can transfer a multiple of the nominal power of the steering motor as what is known as "regenerative power" from the drive side on the inside of the bend to the drive side on the outside of the bend. As a result of this electromechanical power transfer, the reactive power flows via the mechanical gear mechanism arrangement and not via the electric motors, with the result that the latter can be configured in accordance with the primary performance of the vehicle.

A further embodiment of this document provides an electric traction motor which drives the carrier of a differential bevel gear mechanism. An electric steering motor is provided on both output shafts of the differential bevel gear mechanism, which output shafts are connected to the track wheels of the vehicle. In this arrangement, the electric steering motors can be used to assist the traction drive. For this reason, the three electric motors can be designed to be smaller. In this arrangement, however, drive power cannot be transmitted from one drive side to the other drive side mechanically.

In a similar arrangement is known from US 2004/0116228, a differential gear mechanism which comprises two planetary gear mechanisms is provided between the two drive sides. The two planetary gear mechanisms are arranged next to one another and their planetary carriers are coupled fixedly in terms of rotation to one another. An electric steering motor can drive the two sun gears in opposite rotational directions and the planetary gear mechanisms output their drive via their internal gears. The internal gears are connected to a first end of motor shafts of electric traction motors. The track drive wheels or wheels are arranged at the other ends of the motor shafts. If the single current supply circuit fails, a vehicle having a drive axle of this type can no longer be steered.

EP 1 060 941 B1 has disclosed a device for the actuation and operation of an electric vehicle drive. The vehicle has current generation devices and devices for detecting the operating signals of the driver for driving, braking and steering. The operating signals are forwarded via devices for the electronic processing of signals to power units which actuate electric traction motors.

One drive motor is provided for each drive side, which drive motor is assigned in each case one power unit. Each drive motor and power unit is divided in each case into at least two part motors or part units. The part units of the power units and the part motors of the two drive sides are connected to one another in such a way that every power unit can actuate in each case at least one part motor of every drive motor present.

SUMMARY OF THE INVENTION

As no mechanical coupling is provided between the two drive sides in this electric vehicle drive, the regenerative steering power has to be transmitted purely electrically from one drive side to the other. Here, the traction motors have to designed not only in accordance with the current generation device which is present in the vehicle, but additionally also have to be capable of absorbing the regenerative power which flows from the drive side on the inside of the bend to the drive side on the outside of the bend. This requires excessively dimensioned electric motors and complicated cabling for correspondingly larger electric currents.

It is the object of the invention to provide an electric steering and drive system for a vehicle having a wheel-based steering system and having a differential gear mechanism arrangement between the two drive sides, which electric steering and drive system has increased operational reliability.

According to the invention, electric current for the traction drive and the steering drive is provided by at least two energy sources which can be operated independently of one another.

As a result of the steering and drive system according to the invention, a vehicle can also continue to be driven and steered in the event of failure of individual drive elements.

DETAILED DESCRIPTION OF THE PRESENTLY PREFERRED EMBODIMENTS

Figure 1:
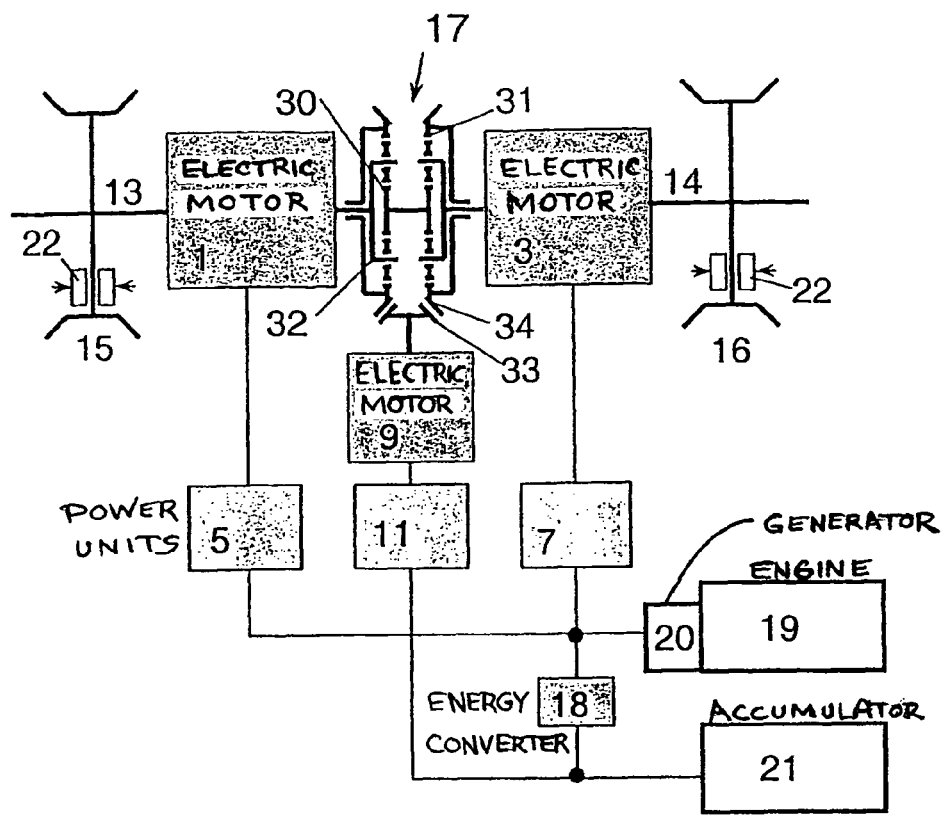
FIG. 1 shows a block circuit diagram of a first embodiment of the drive system according to the invention.

FIG. 1 shows a drive axle of the electric steering and drive system according to the invention for a tracked vehicle. Instead of the track wheels 15, 16, it is also possible for wheels of a wheeled vehicle to be provided.

At least one energy source is required to generate the electric drive power. In this example, an internal combustion engine 19 is provided which drives a current generator 20. An accumulator 21 (or a similar energy store) is available as a second independent energy source.

In each case one electric motor 1, 3 is provided as traction drive for both drive sides of the vehicle. The shafts 13, 14 of the electric motors are continuous and emerge at the two ends of the motors 1, 3. The first end of the shafts 13, 14 is connected in each case to a chain sprocket 15, 16 as a drive element for a traction track. The respective second ends of the shafts 13, 14 are connected to a differential gear mechanism arrangement 17. The traction motors 1, 3 are actuated by power units 5, 7 which for their part are supplied with current by the generator 20.

The differential gear mechanism arrangement 17 comprises two planetary gear mechanisms which are arranged next to one another. The sun gears 30 of the two planetary gear mechanisms are coupled to one another and fixedly in terms of rotation to a shaft. The planetary carriers 32 are connected to the shafts 13, 14 of the traction motors 1, 3. An electric steering drive drives the internal gears 31 of the planetary gear mechanisms in the opposite direction via a bevel pinion 33 and bevel gears 34.

The steering drive comprises an electric motor 9 which is actuated by a power unit 11 which for its part is supplied with current from the accumulator 21.

In normal operation, the accumulator 21 is charged by an energy converter 18, starting from the generator 20. The energy converter comprises a protective device which separates the generator and the accumulator in the event of a defect in the system. The accumulator 21 and the internal combustion engine 19 with the generator 20 therefore represent two independent energy sources within the context of this invention.

An energy converter 18 converts the electric energy which is generated by generator 20, in such a way that said this energy can be used to charge an accumulator 21.

In the event of the failure of any electrical component of the system, the ability to steer the vehicle can be ensured at least until it rolls to a halt.

If the steering motor 9, its power unit 11, the accumulator 21 or the energy converter 18 fails, the vehicle can still be steered by a targeted setting of different rotational speeds at the two traction motors 1, 3.

If a traction motor 1, 3 or its power unit 5, 7 or the generator 20 or the internal combustion engine 19 fails, the energy converter 18 separates the accumulator 21 and the steering motor 9 from the traction system. The steering motor 9 then receives the required power from the accumulator 21, in order to continue to ensure the steering.

The capacity of the accumulator 21 must be designed to be sufficient, in order to ensure the steering system independently of other energy sources. As a defective motor 1, 3 or 9 can also exert a braking resistance counter to the rotation of its shaft, this braking performance must likewise be considered during the design of the drive system.

Figure 2:
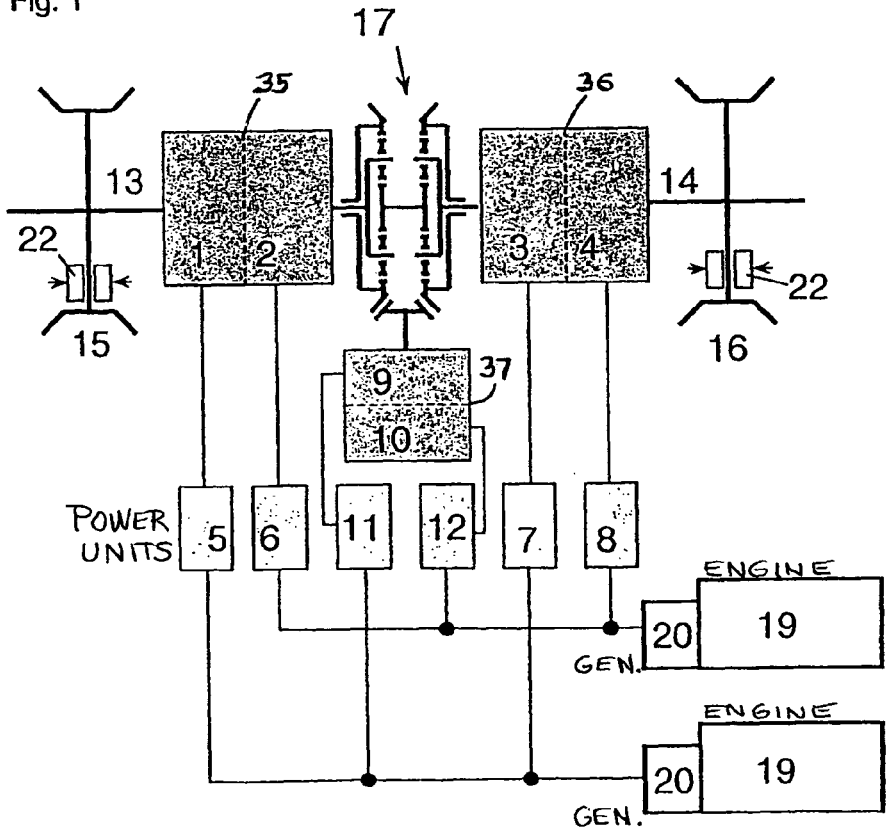
FIG. 2 shows a further embodiment of the drive system according to the invention.

FIG. 2 shows a further embodiment according to the invention of the electric steering and drive system. Instead of the chain sprockets 15, 16, wheels of a wheeled vehicle can also be provided.

The mechanical arrangement of the traction and steering motors on the differential gear mechanism arrangement 17 has already been explained with respect to FIG. 1.

At least one current generation device is required for generating the electric drive power. In this example, at least two internal combustion engines 19 are provided which in each case drive one current generator 20. Diesel engines are preferably used as internal combustion engine 19. Fuel cells and (emergency) batteries (accumulators) can also be used as current generation device or energy store, however. It is also possible to connect a plurality of generators to one internal combustion engine or to connect one generator to a plurality of internal combustion engines.

In each case at least two electric motors 1, 2 and 3, 4 are provided as traction drive for both drive sides of the vehicle, which electric motors are supplied from different energy sources. The traction motors 1, 3 are actuated by power units 5, 7 which for their part are supplied with current by a generator 20. The traction motors 2, 4 are actuated by power units 6, 8 which for their part are supplied with current by another generator 20.

Instead of two electric motors 1, 2 or 3, 4 as traction drive, electric motors having at least two current circuits which are independent of one another can also be provided.

The steering drive comprises at least two electric motors 9, 10 or one electric motor having at least two current circuits which are independent of one another. The two part motors 9, 10 of the steering drive are actuated in each case by a power unit 11, 12 which for their part are supplied with current by different generators 20.

If one of the electric steering motors 9, 10 fails, the vehicle can continue to be steered with the power of the other steering motor 10 or 9.

Fireproof bulkheads 35, 36, 37 are preferably provided as insulation against fire between the different part motors of the traction drive 1, 2 and 3, 4 and 9 and 10 or between the different current circuits of the steering drive. If one of the motors or one of the different current circuits catches fire, for example as a result of overheating, the other is protected at least for a certain time and can continue to be operated. The term fireproof bulkhead is to be understood as divisions which are made from fireproof or fire-resistant material. This also includes protection of one (part) motor against excessive heat development of the other (part) motor.

Figure 3:
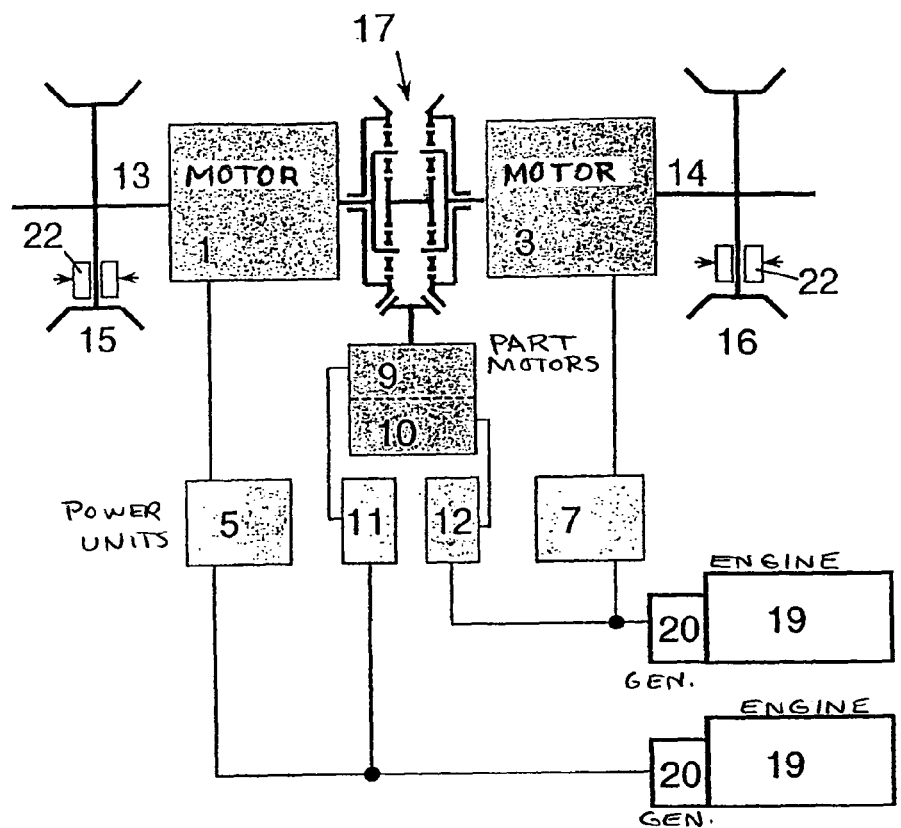
FIG. 3 shows a further embodiment of the drive system according to the invention.

In principle, only one traction motor 1, 3 could be provided in each case, as shown in FIG. 3: instead of the two traction motors 1, 2 on one drive side, only one single traction motor 1 can be provided which is supplied from a first current source. Instead of the two traction motors 3, 4 on the other drive side, one single traction motor 3 can be provided which is supplied from a second current source. If one current supply circuit fails, the vehicle can be operated (with reduced performance) with the second remaining traction motor. In this arrangement, the steering motor has to generate a supporting moment even when travelling in a straight line, which supporting moment also transfers the power of the intact motor to the defective side via the differential arrangement. As two (part) steering motors 9, 10 are provided, at least one steering motor is still usable even in the case of a defect.

Figure 4:
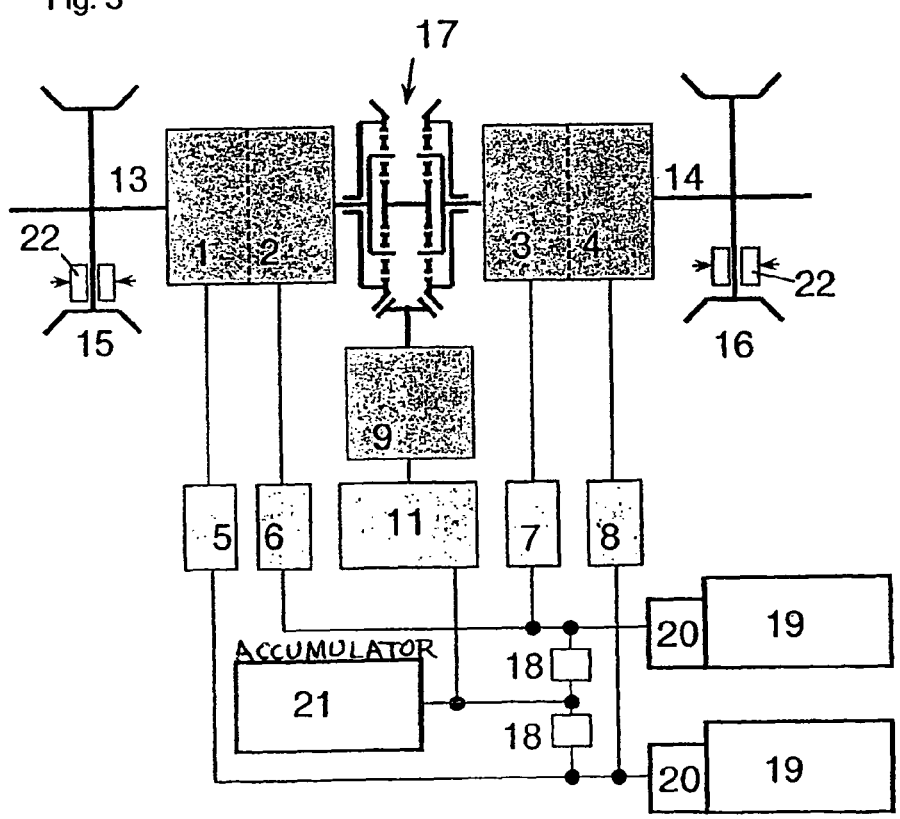
FIG. 4 shows a further embodiment of the drive system according to the invention.

The embodiment (shown in FIG. 4) of the drive system according to the invention corresponds substantially to the embodiment according to FIG. 2, only one steering motor 9 being provided, however, which is connected to an independent energy source. One traction drive is provided for each drive side, which traction drives comprise in each case at least two electric traction motors 1, 2 and 3, 4. The traction motors 1, 2 and 3, 4 are actuated in each case by separate power units 5, 6 and 7, 8 which are preferably supplied with current in pairs by different current generators 20.

The accumulator 21 can be charged by the generators 20 via the energy converters 18. In the case of a fault, the above-mentioned protective devices in the energy converter can separate the steering motor 9 with its energy source from the current circuits of the traction motors.

In the case of a defect in the system of one of the energy sources, this complete system can be switched off and driving operation can be continued with the two remaining systems.

Instead of the differential gear mechanism arrangement 17 which is described with respect to FIGS. 1 to 4, another differential gear mechanism arrangement which acts in the same way can also be provided; for example, differential gear mechanism arrangements of the type according to FIGS. 2 and 3 of US 2004/0116228.

Fuel cells or energy stores such as batteries, accumulators or flywheel stores can also be provided as electric current sources.

Mechanical friction brakes 22 which can preferably be actuated in each case separately from one another are provided on the drive shafts 13, 14. If the above-described energy supply systems fail, these friction brakes 22 can be used as an emergency steering device. A further independent energy source can be provided for actuating the friction brakes 22. In the case of hydraulically actuated brakes 22, this energy source can be, for example, a pressure accumulator which is filled via a pump. The pump can be connected in a redundant manner to different supply circuits and builds the corresponding pressure up in the pressure accumulator, which pressure is sufficient for it to be possible to brake the vehicle reliably. If the pump or its current supply circuit fails, the pressure accumulator maintains the brake pressure which has been built up.

The traction tracks or wheels of the two drive sides can be braked in a targeted manner to different speeds by the capability of the brakes 22 to be actuated separately and independently of one another, and an (emergency) steering function is therefore possible.

What is claimed is:

1. An electric steering and driving system for a lateral wheel steering vehicle, comprising:
   driving elements for chains or for wheels, having two drive shafts, wherein one first end of a respective drive shaft is connected to the driving element on respectively one side of the vehicle and wherein a second end of a respective drive shaft is connected to a differential gear assembly;
   at least one traction drive which is connected to at least one of the two drive shafts;
   an electric steering drive in driving connection with the differential gear assembly; and
   at least two mutually independent energy sources,
   wherein all traction drives are powered with electric current from at least one of these independent energy sources and the steering drive unit is separately powered with electric current from another of these independent energy sources,
   wherein the steering drive comprises one electric motor and, respectively for both drive shafts of the vehicle, at least one electric traction drive is provided, at least one electric traction drive comprises one of at least two electric motors and one electric motor with at least two mutually independent current circuits.

2. An electric steering and driving system for a lateral wheel steering vehicle, comprising:
   driving elements for chains or for wheels;
   two drive shafts, whereof one first end of a respective drive shaft is connected to the driving element on respectively one side of the vehicle and whereof a second end of a respective drive shaft is connected to a differential gear assembly;
   at least one traction drive which is connected to at least one of the two drive shafts;
   an electric steering drive in driving connection with the differential gear assembly;
   at least two mutually independent energy sources, wherein all traction drives are powerable with electric current from at least one of these independent energy sources and that the steering drive unit comprises at least two electric motors or of one electric motor with at least two mutually independent current circuits; and
   separately controllable mechanical friction brakes arranged at the at least two drive shafts,
   wherein the at least two electric motors and the independent current circuits respectively are separately powered with electric current from the at least two mutually independent energy sources.

3. The electric steering and driving system according claim 2, wherein that at least one generator is provided for power generation, which is propelled by at least one combustion engine.

4. The electric steering and driving system according to claim 2, wherein at least one of a fuel cell and an energy store is provided as electric power source.

5. The electric steering and driving system according to claim 2, wherein a fireproof bulkhead is provided at least one of
   between the different motors of a traction drive and the steering drive and
   between the different current circuits of the traction drives and the steering drive.

6. The electric steering and driving system of claim 2, further comprising a further independent energy source for operating the friction brakes.

7. An electric steering and driving system for a lateral wheel steering vehicle, comprising:
   driving elements for chains or for wheels;
   two drive shafts, whereof one first end of a respective drive shaft is connected to the driving element on respectively one side of the vehicle and whereof a second end of a respective drive shaft is connected to a differential gear assembly;
   at least one traction drive which is connected to at least one of the two drive shafts;
   an electric steering drive in driving connection with the differential gear assembly; and
   at least two mutually independent energy sources, wherein all traction drives are powerable with electric current from at least one of these independent energy sources and that the steering drive unit comprises at least two electric motors or of one electric motor with at least two mutually independent current circuits,
   wherein the at least two electric motors and the independent current circuits respectively are separately powered with electric current from the at least two mutually independent energy sources,
   wherein for both drive shafts of the vehicle at least one traction drive is provided, which respectively comprises at least one of at least two electric motors and one electric motor with at least two mutually independent current circuits.

8. The electric steering and driving system according claim 7, wherein that at least one generator is provided for power generation, which is propelled by at least one combustion engine.

9. The electric steering and driving system according to claim 7, wherein at least one of a fuel cell and an energy store is provided as electric power source.

10. The electric steering and driving system according to claim 7, wherein a fireproof bulkhead is provided at least one of between the different motors of a traction drive and the steering drive and between the different current circuits of the traction drives and the steering drive.

* * * * *